March 9, 1965  L. J. MATTINGLY ET AL  3,172,643
MECHANISM FOR TRANSPORTING AND STRINGING AERIAL CABLE
Filed Oct. 2, 1962  4 Sheets-Sheet 1
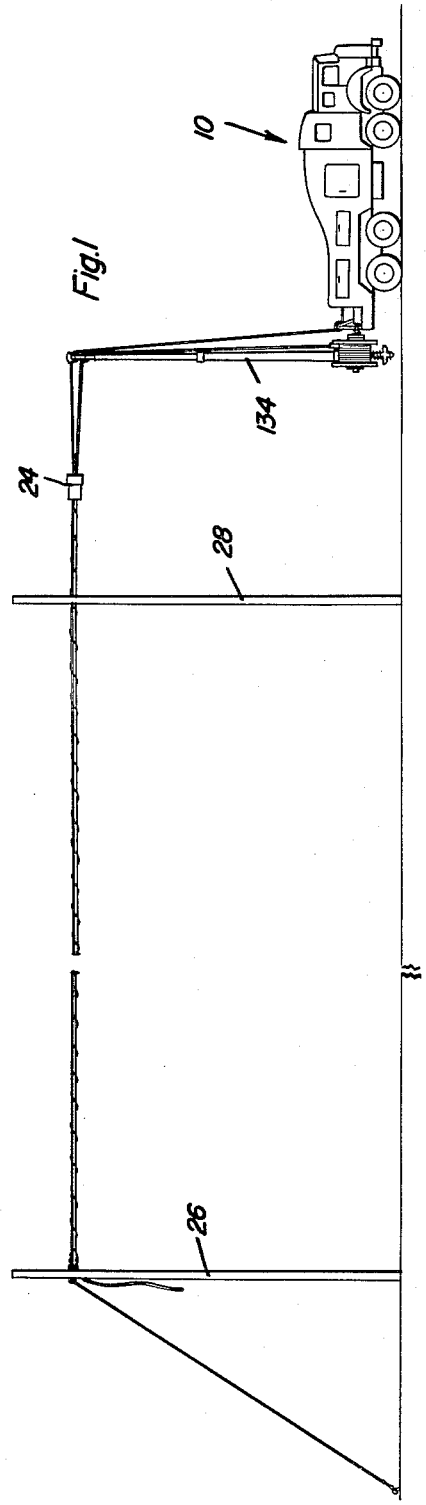
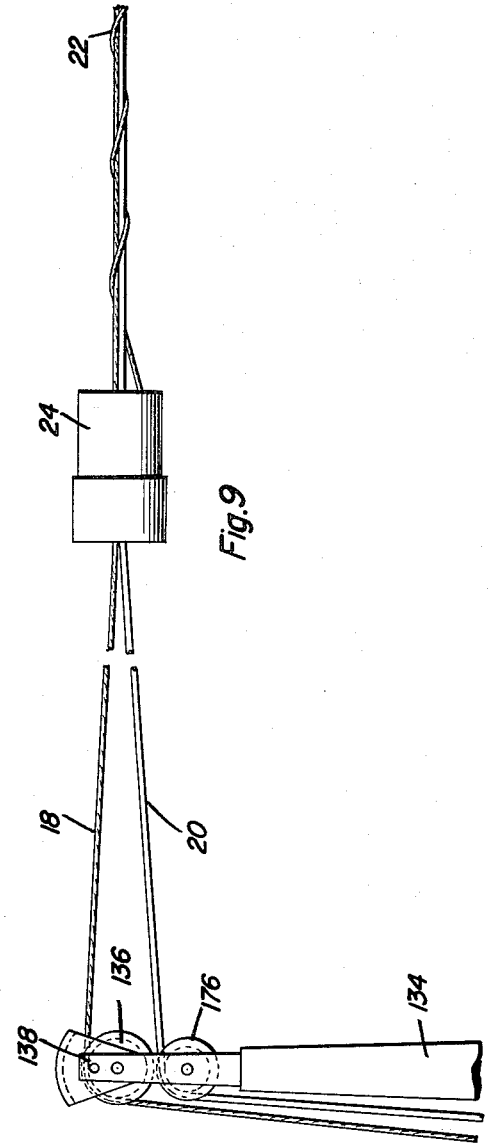
Lester J. Mattingly
Walter W. Happe
INVENTORS.
BY Clarence A. O'Brien
and Harvey B. Jacobson
Attorneys

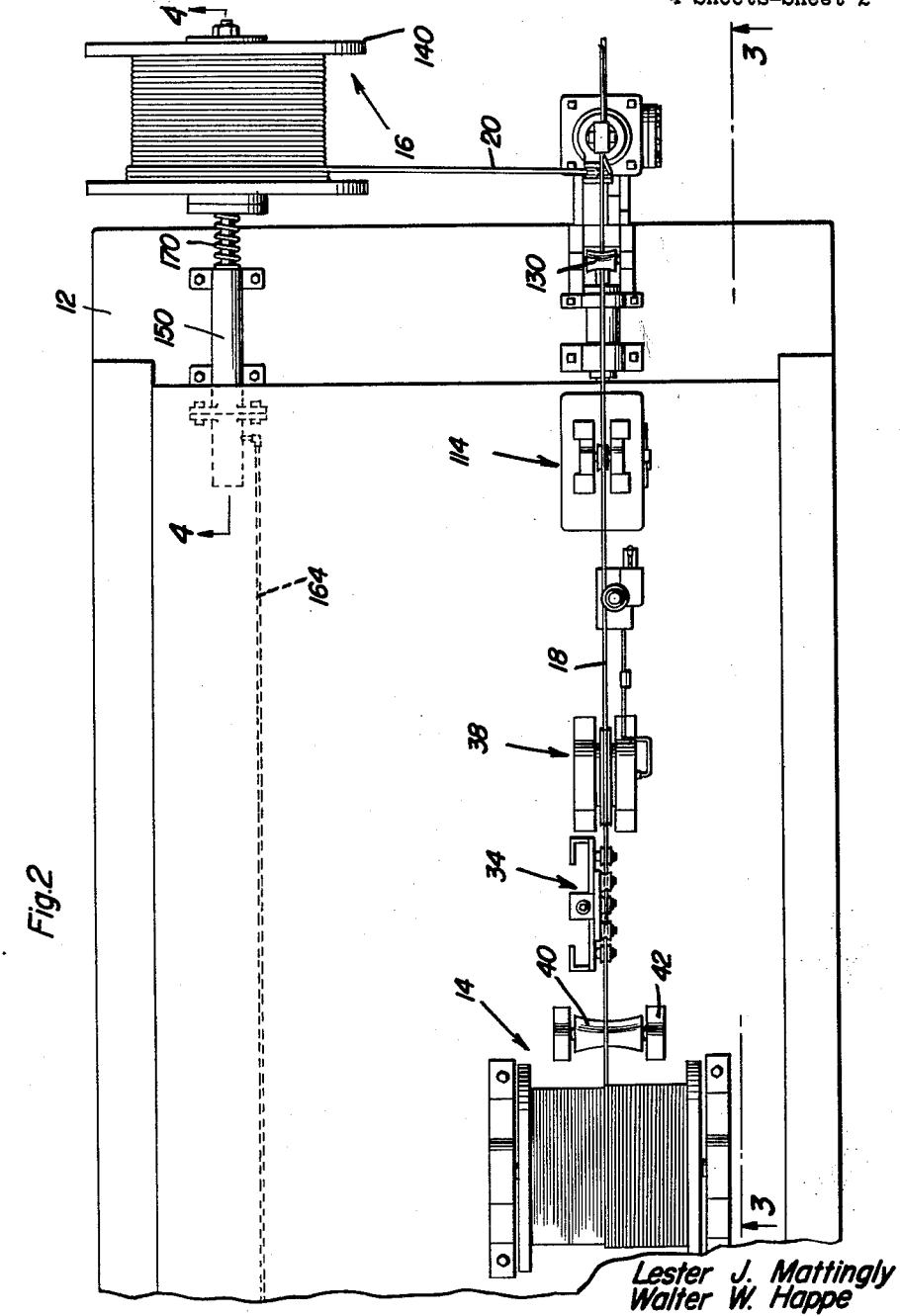

March 9, 1965 L. J. MATTINGLY ET AL 3,172,643
MECHANISM FOR TRANSPORTING AND STRINGING AERIAL CABLE
Filed Oct. 2, 1962 4 Sheets-Sheet 3
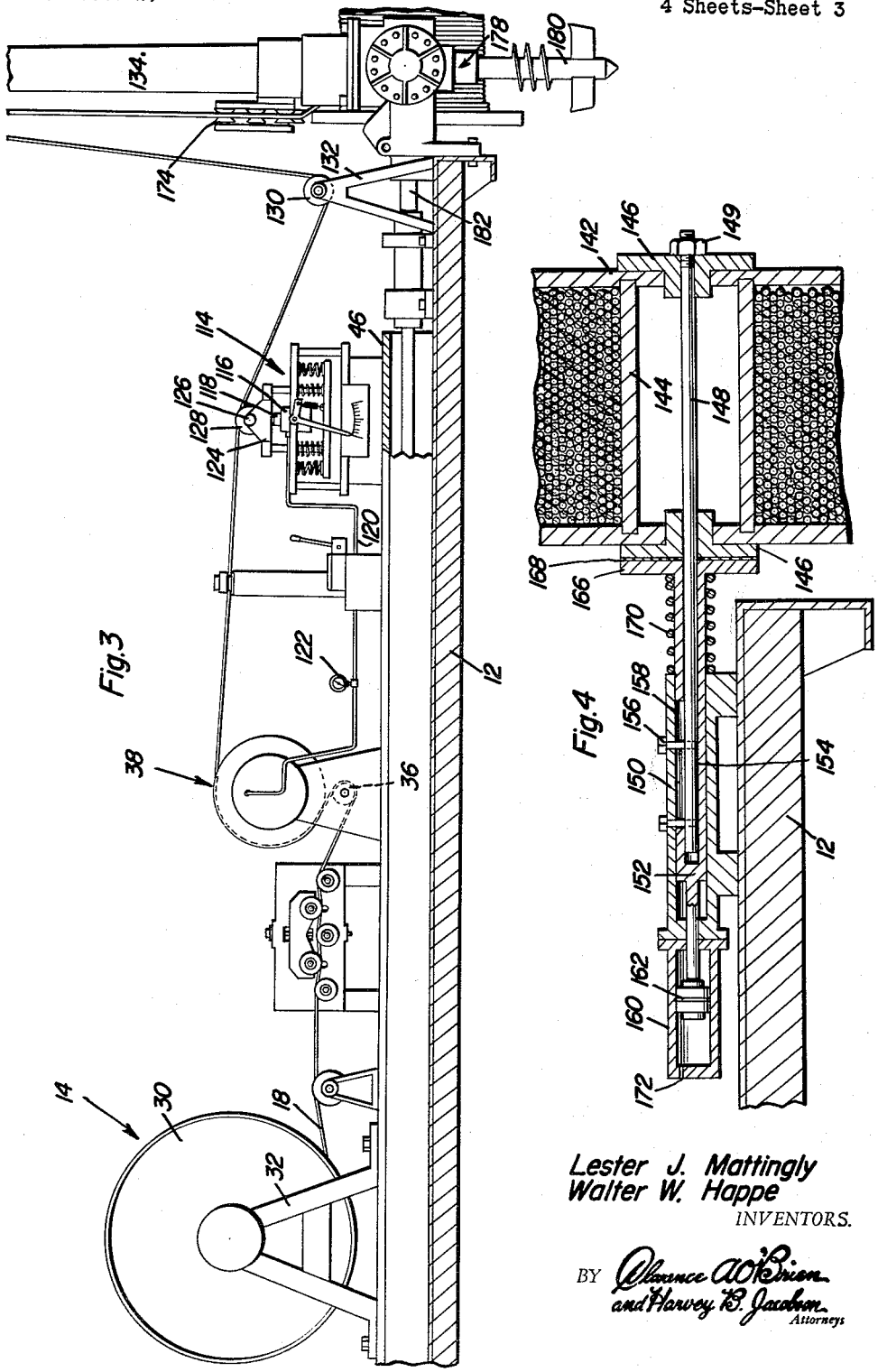
Lester J. Mattingly
Walter W. Happe
INVENTORS.
BY *Clarence A. O'Brien*
*and Harvey B. Jacobson*
Attorneys March 9, 1965 L. J. MATTINGLY ET AL 3,172,643
MECHANISM FOR TRANSPORTING AND STRINGING AERIAL CABLE
Filed Oct. 2, 1962 4 Sheets-Sheet 4
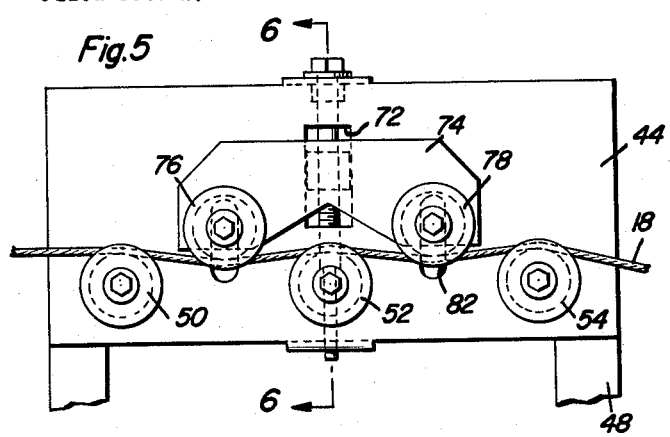
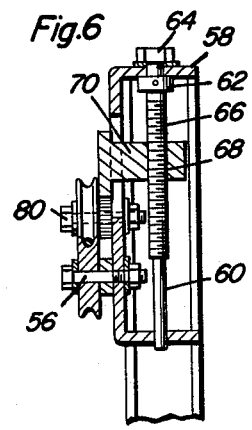
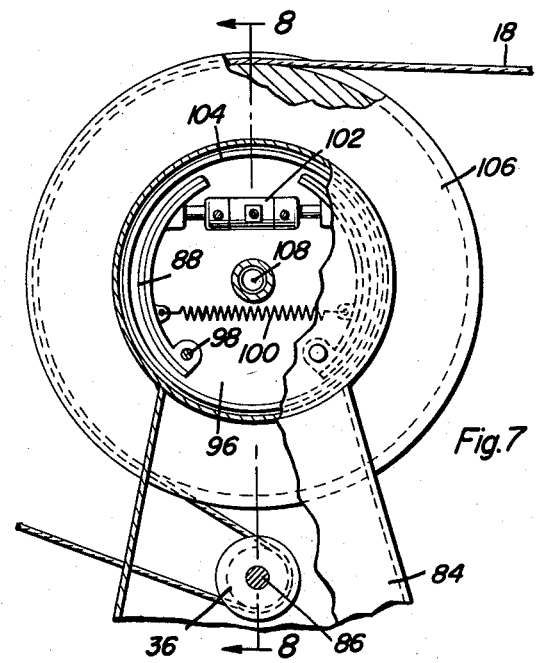
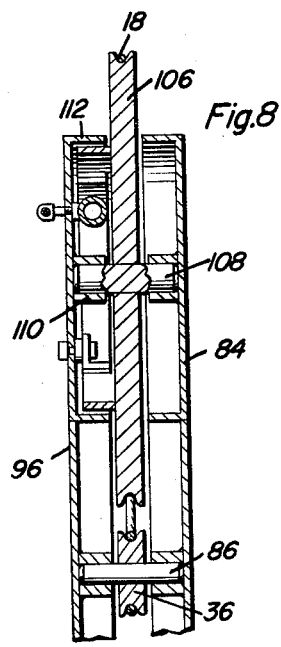
Lester J. Mattingly
Walter W. Happe
INVENTORS.
BY
Attorneys

United States Patent Office 3,172,643
Patented Mar. 9, 1965

3,172,643
MECHANISM FOR TRANSPORTING AND
STRINGING AERIAL CABLE
Lester J. Mattingly, 1625 Horseshoe Drive, Florissant,
Mo., and Walter W. Happe, 1170 Ashford Drive, St.
Louis, Mo.
Substituted for abandoned application Ser. No. 84,838,
Jan. 25, 1961. This application Oct. 2, 1962, Ser. No.
233,169
8 Claims. (Cl. 254—134.3)

The present invention generally relates to a novel apparatus and method for transporting and installing aerial cable and aerial strand and more particularly to such an apparatus and method for installing aerial strand and aerial cable at the same time, and is a substitute for abandoned application Serial No. 84,838, filed January 25, 1961.

The primary object of the present invention is to provide a method and apparatus for securing an aerial cable to a supporting aerial strand in such a manner that the spiral wrappings of the lashing wire are substantially uniform and firmly embrace both the aerial cable and aerial supporting strand.

Another very important object of the present invention includes the provision of means for accurately controlling the tension on the aerial cable and aerial strand during installation in order to provide proper tension before the aerial strand is permanently bolted to the pole to complete the run.

In the present practice of installing aerial cable, the cable is normally supported from a supporting strand sometimes called the messenger strand by lashing the cable to a previously installed supporting strand by means of a cable lashing machine. For example, the cable lashing machine disclosed in Patent No. 2,272,253 and Patent No. 2,544,313 are representative and in these patents, it is the practice to secure the supporting strand to suitable poles at regular intervals and temporarily support the strand by means of blocks, rings or the like. This method of cable lashing employing a lashing machine of the type referred to above is intended to traverse the strand and securely bind the cable and strand together by means of a suitable wrapping of lashing wire, the temporary support blocks or rings being pushed along in front of the lashing machine as the machine progresses along the strand. For example, the method of installing, transporting and prelashing of aerial strand and cable is disclosed in Patent No. 2,703,218 and in this patent, it is required that the strand and cable to be transported by means of a trailer with the prelashed cable and strand adapted to be hoisted into position on the pole and then supported in a conventional manner. This is usually accomplished by means of sheaves secured to the pole and having a winch or towline passing therethrough, one end of which is secured to the winch on the truck and the other attached to the ends of the strand and cable. While the above discussed methods of installing aerial cable and strand have been successful to some degree and can be used in certain instances, there are conditions existent where it is advisable and economical to simultaneously place the cable and strand together at the same time prior to its being placed in its permanent position on the pole line. In the present invention, any suitable cable lashing machine can be used for wrapping the lashing wire around the strand and cable.

Accordingly, it is an essential object of the present invention to provide a novel method and apparatus for transporting a larger amount of cable and strand and a more economical and less costly method of placing aerial cable and strand from a self-propelled truck with the cable and strand being lashed prior to it being permanently secured to each pole as the cable placing progresses.

Still another feature of the present invention is the provision of facilities which enable the cable and strand to be placed at the same time in a more efficient method and in which the tension on the cable and the strand may accurately be controlled during the installation to provide the proper tension as the cable and strand placing progresses.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic side elevational view illustrating the aerial cable and strand being installed in accordance with the present invention;

FIGURE 2 is a plan view of the tensioning equipment illustrating the orientation thereof on the truck;

FIGURE 3 is a side elevational view of the construction of FIGURE 2 taken substantially upon reference line 3—3 of FIGURE 2;

FIGURE 4 is a longitudinal, vertical sectional view taken substantially upon a plane passing along section line 4—4 of FIGURE 2 illustrating the brake control of the cable reel;

FIGURE 5 is a detailed elevational view of the pretensioning device;

FIGURE 6 is a transverse, sectional view taken substantially upon a plane passing along section line 6—6 of FIGURE 5 illustrating the structural details thereof;

FIGURE 7 is a detailed view, with portions broken away illustrating the hydraulic braking system for the strand;

FIGURE 8 is a detailed sectional view taken substantially upon a plane passing along section line 8—8 of FIGURE 7 illustrating the structural details of the hydraulic braking system; and FIGURE 9 illustrates the details of the derrick crown block and the relationship of the strand and cable as they are lashed by the lashing machine.

Referring now specifically to the drawings, the numeral 10 generally designates the self-propelled truck or vehicle of any suitable type which is employed in conjunction with the present invention and includes a suitable truck bed or platform 12. Mounted on the platform 12 is a strand supporting assembly generally designated by reference numeral 14 and a cable supporting assembly generally designated by the reference numeral 16. The strand is designated by reference numeral 18 and the cable designated by reference numeral 20. The strand 18 and cable 20 are secured together with the cable 20 supported from the strand 18 by lashing wire 22 spirally wrapped around the strand and cable by a suitable lashing machine 24. The particular details of the lashing machine form no particular part of the present invention. In placing the aerial strand and aerial cable, they are supported by and between adjacent poles such as the poles 26 and 28 illustrated in FIGURE 1.

The strand supporting assembly 14 includes a reel 30 on which the strand 18 is wound and the reel 30 is removably supported for rotation by stationary supports 32. Any suitable split-type bearing or bracket (not shown) may be provided at the upper end of the supports 32 for enabling removal and replacement of the reel 30 so that a new spool or reel may be disposed in position when the strand has been depleted on the reel. Also, the strand storage reel 30 is provided with a standard electrical braking device (not shown) to provide a drag thereon to brake the strand reel in order to prevent the strand from overrunning and becoming entangled in the event that it is necessary to halt the placing operation.

Mounted in alignment with the strand reel 30 is a pretensioning device generally designated by reference numeral 34, the details of which are shown in FIGURES 5 and 6. The pretensioning device applies an initial or rough tension adjustment to the strand 18 prior to its passing around a strand guide roller 36 and around the tensioning pulley generally designated by reference numeral 38. Disposed between the pretensioning device 34 and the strand reel 30 is a guide roller 40 rotatably supported by suitable bearing brackets 42 for guiding the strand 18 from the reel into the pretensioning device 34. The roller 40 is tapered towards the center, that is, it is provided with a smaller central diameter than outer end diameter thereby guiding the strand towards the pretenioning device 34 in a straight line manner even when the strand is being unwound from a position adjacent the ends of the reel 30.

The pretensioning device 34 includes a vertically disposed plate 44 supported from the platform 12 or from a suitable plate 46 overlying the platform 12 by virtue of supporting brackets 48. Mounted on the plate 44 are three non-adjustable rotatable rollers 50, 52 and 54 each of which is mounted on a suitable axle bolt 56 and these pulleys are spaced apart in horizontal alignment. The axle bolt 56 extends through the plate 44 and is secured thereto rigidly. The upper and lower edge of the plate 44 is provided with a laterally extending flange 58 through which extends an elongated rod 60 rotatably journalled therein and held captive on the top flange 58 by virtue of a collar 62 and a polygonal headed end 64 suitable for receiving a wrench or the like. A portion of the rod 60 is threaded as indicated by numeral 66 and is screw threadedly received in an internally threaded bore 68 received in a laterally extending lug 70 which extends through a vertical slot 72 in the plate 44. The lug 70 is rigid with and integral with a vertically sliding support plate 74 which carries a pair of adjustable rollers 76 and 78 thereon. The rollers 76 and 78 are each journalled on an axle bolt 80 which extends through the respective rollers 76 and 78 and also through the plate 74 and vertical slots 82 in the plate 44 whereby rotation of the threaded rod 60 will cause vertical movement of the plate 74 and the rollers 76 and 78 thereon. The plate 74 may be considered a yoke member and the pulleys 76 and 78 are supported in horizontal alignment and in staggered relation to the pulleys 50, 52 and 54 whereby the strand 18 will necessarily have to be threaded between the stationary and movable pulleys and each of the pulleys is provided with an external surface for receiving the strand 18.

The details of the tensioning pulley 38 are illustrated in FIGURES 7 and 8 and includes a pair of supporting brackets 84 which rotatably support the guide pulley 36 on an axle or shaft 86. The tensioning pulley 38 controls the braking effect of the strand and this is controlled by a pair of braking shoes 88 pivotally supported on a suitable backing plate 96 by pivot pins 98. The backing plate 96 is rigid with the supports 84 and the brake shoes 88 are urged inwardly towards each other by a spring 100 and are moved outwardly by a hydraulically operated piston and cylinder arrangement 102. The brakes shoes 88 will engage a rotatable brake drum 104 rigid with an enlarged pulley 106 for retarding rotation of the pulley 106. The construction of the hydraulic brake and drum assembly is of substantially conventional hydraulic brake construction in which the drum 104 and pulley 106 are supported on a central axle or spindle 108 rigid with the support members 84 by virtue of being supported in sockets 110. The backing plate 96 also includes a flange 112 which partially encloses the brake drum 104. The strand 18 passes under and around the guide pulley 36 and then over top of the enlarged braking pulley 106.

Disposed in alignment with the braking pulley 38 is a hydraulic compensator assembly generally designated by reference numeral 114. The hydraulic compensator 114 includes a hydraulic cylinder 116 having a plunger 118 in the form of a piston mounted therein. The cylinder is oil filled and a hydraulic line 120 provided with a pressure gauge 122 interconnects the cylinder 116 and the brake cylinder and piston assembly 102. The plunger 118 engages a bar 124 supporting a shaft 126 carrying a pulley 128 over which the strand 18 passes. The bar is adapted to move inwardly and outwardly under the influence of the shaft in accordance with the pressure imparted to the plunger in the housing by oil pressure in the line which is built-up by the action of the strand tension roller 38 in accordance with the tension in the strand 18. The strand 18 as it leaves the compensating pulley 128 passes under a strand guide pulley 130 supported by suitable brackets 132 and then upwardly alongside the drill derrick 134 and through a crown block or pulley 136 supported at the top of the derrick 134 by bracket members 138.

The primary purpose of the compensator is to induce or reduce tension in the strand after leaving the braking device as illustrated in FIGURE 3 by numeral 38 and prior to the strand entering guide pulley 130 and also to reduce surging in the strand after it leaves the guide roller 136 in the crown block. The minute details of the compensator are immaterial since there are several commercially available compensators which are adequate.

The tension of the strand is accurately controlled before it enters the strand guide pulley 136 in the derrick crown block and before it enters the cable lashing machine and it is essential in the present invention that the cable be lashed to the supporting strand prior to its installation on the supporting poles.

An initial tension is applied to the strand 18 by means of the pretensioning mechanism wherein the tension may be varied by the adjustment of the movable rollers 76 and 78. Since this is an initial tension and in effect a rough adjustment, a fine and accurate adjustment is obtained by passing the strand 18 around the brake pulley 106 which is controlled by means of a hydraulic brake assembly secured to the backing plate and within the confines of the brake drum. In order to maintain the tension in the strand 18 within very close limits, the hydraulic compensator assembly 114 is provided and includes the pulley 128 over which the strand rides. As soon as any change in the tension of the strand exists, this change will immediately be transmitted to the pulley 128 thereby activating the compensator and braking device thus assuring a uniform and accurate tension of the strand as it is fed to the lashing machine. The lashed cable and its strand 18 after it leaves the lashing machine may then be placed in position on the poles and permanently secured thereto as shown in FIGURE 1.

FIGURES 2 and 4 illustrate the details of the cable supporting assembly 16 which includes a cable reel or spool 140. The cable reel 140 includes side plates 142 and a central cylindrical spindle 144 provided with end plates 146 through which extends a supporting shaft or rod 148. The rod 148 is provided with a removable nut 149 on the outer end thereof for permitting removal of the outer plate 146 and removal of the spool or reel 140. For supporting the shaft 148, there is provided a cylindrical member 150 rigidly supported to the truck bed or platform 12 by any suitable means. Slidable in the casing 150 is an hydraulically actuated piston 152 provided with a longitudinal bore 154 therein which supportingly engages an end portion of the supporting rod or shaft 148 which is elongated and which is adjustably held in the bore 154 by retaining bolts, pins or the like 156 whereby the position of the inner end of the rod 148 may be adjusted for receiving various width spools. Where the bolts or retainers 156 extend through the piston 152, there is provided a slot 158 which enables adjustment of the piston 152 in relation to the rod 148. Attached to the end of the casing 150 is hydraulic cylinder 160 having a piston 162 disposed therein together with hydraulic lines 164 connected therewith for actuating the piston 162. Attached to the piston 152 is a braking plate 166 which engages the inner plate 146 with either or both of the plates 146 and 166 being provided with a brake lining 168. A coil spring 170 extends between the plate 166 and the adjacent end of the stationary casing 150 for normally providing restriction to rotation of the reel 140 with the piston 162 serving to overcome the tension of the spring 170 and disengage the brake plate 166 thus permitting rotation of the reel 140. The outer end of the cylinder 160 is vented as indicated by numeral 172 for enabling movement of the piston 162 under the influence of hydraulic pressure entering through the control line 164 which extends to a suitable hydraulic control panel (not shown) disposed at a remote location such as in the cab of the truck or at an operator's platform and it is understood that the desired amount of braking effect may be instantaneously applied with the least amount of required effort. Further, the truck is equipped with a suitable conventional hydraulic pump for supplying hydraulic pressure to the hydraulic panel and the pump may be driven from a suitable power take-off from the truck transmission and will be in operation at all times while the cable and strand placing is in progress. The hydraulic control panel will also supply the requisite quantity of hydraulic power to the control of the pretensioning braking pulley and the hydraulic compensator mentioned heretofore.

The cable 20 also extends laterally from the reel 140 and over guide pulleys 174 at the bottom of the derrick 134 and also over a cable pulley 176 in the crown block of the derrick 134. The derrick 134 is a part of an earth boring machine generally designated by numeral 178 and which includes an earth auger 180 and a drive shaft 182 which is normally used for setting poles and which is employed in conjunction with the present invention to support the pulleys for the strand and cable in the form of a crown block at the top end thereof.

While the particular orientation of the strand reel and cable reel as illustrated is preferable, it is pointed out that such reels or spools may be supported in other orientations with suitable guide pulleys being employed for guiding the strand and cable in the desired orientation to the derrick.

As disclosed, the hydraulic casing and the shaft are employed to activate the coil spring to apply pressure to the brake plates, and the source of hydraulic power is also used to activate the hydraulic cylinder for the brake to be effective for controlling the movement of the cable reel thereby restricting the movement of the cable as it enters through the cable guide rollers at the bottom of the derrick. This is done simultaneously as the strand enters the strand guide roller at the bottom of the derrick. From the crown block both the strand and the cable enter the cable lashing machine and the cable and strand are spirally connected together by the lashing wire prior to their being placed on the pole permanently. The object of the cable and the strand being placed by the use of the derrick of the earth boring machine is to provide greater utility for such derrick and also, the derrick makes it possible for the elevation of the strand and cable to be changed by telescoping the internal tube of the derrick. The derrick crown block is, of course, capable of being rotated about an axis transverse to the longitudinal axis of the machine or chassis in order that the derrick crown block may be shifted outwardly or inwardly relative to its vertical position as seen in FIGURE 2.

The crown block is capable of being rotated to different angles laterally relative to the chassis for adjusting the position of the cable under which conditions the crown block operates about a longitudinal axis. The foregoing is a conventional mode of adjustments being obtained by certain well known mechanism as disclosed in prior patents and this original intended use of the boring machine to dig holes for the poles and the derrick which is used to place various heights of poles has not been changed but the additional structure connected therewith enables additional uses for the derrick.

The procedure for placing aerial strand will include the placement of a 5,000 foot reel of strand on the bed of the truck and placing the strand through the pretensioning equipment, through the block at the base of the earth boring machine derrick and through the derrick crown block and then to the guide pole wherein the strand will be pretensioned at the desired tension.

Strand tension is applied in two steps, by pretensioning rollers and the hydraulic brake and compensator assembly. The pretensioning rollers apply a uniform initial load for a particular size of strand. The load is caused by the strand bending as it passes through the rollers. The hydraulic brake and compensator provide the load in excess of the initial load required to obtain the necessary strand tension. The binding effect of the preloaded strand on the pulley causes the pulley to turn against the resisting force of the brake assembly. The desired braking effect is obtained by controlling the hydraulic pressures applying the brake. It is desirable to maintain the strand tension at a relatively constant level throughout the placing operation. The compensator automatically varies the hydraulic pressure controlling the braking effect and tends to offset line tension variations. Two indicators, the hydraulic pressure gauge calibrated in line tension to give an indication that the hydraulic braking system is functioning and a line tension indicator illustrated in the drawings more accurately measures the tension in the strand and these indicators are provided for the purpose of measuring the tension.

In obtaining the desired strand tension, a handwheel or ratchet wrench is provided for adjusting the movable pretensioning rollers to a mark on the guide indicating the size of strand being used. While the strand is being slowly placed initially, the hydraulic pump is operated while the strand is in motion until the line tension indicator registers the desired tension. If the line tension is higher than desired, reduce the hydraulic pressure by opening the relief valve on the hand operated hydraulic pump a small amount and then close it when the line tension indicator reaches the desired tension. The adjustment of the pretensioning rollers is a preliminary setting which is made prior to the start of placing whereas the hydraulic braking effect is the final operation necessary to obtain the desired tension and can only be made while the placing is in progress. It is impossible to make accurate tension adjustments if the strand is not passing through the equipment. Thus, the placing operation is started slowly and the line tension is adjusted until the line tension indicator indicates the desired placing tension. While the strand is in motion, the necessary adjustments are made so that a uniform speed usually 130 to 150 feet per minute should be maintained. It may be necessary to vary the speed in order to reduce surging while placing and also, a minimum of ten turns of strand on the reel is necessary to maintain tension thus requiring that the strand is not completely paid off the strand reel. A suitable strand meter is provided to determine the amount of strand and telephone cable that has been placed.

In replacing the aerial cable, a spool or reel of aerial cable is placed on the hydraulic spindle which is supported on the truck bed and the cable is threaded through the cable rollers at the base of the derrick of the earth boring machine and through the pulley located in the derrick crown block and to the aerial strand at the dead end pole. The aerial cable and the strand extend through the cable lasher and an aerial cable guide is also provided for guiding the aerial cable. The truck is then moved forward at the desired rate of speed and passes the next pole approximately within ten feet so that the aerial guide and cable lasher have spun past the pole. In other words, the truck proceeds past the next pole so that the cable lasher may lash the cable and the strand together beyond the second pole so that workmen may then move the derrick upwardly to elevate the lashed strand and cable to the desired height and position, and then workmen on the pole can drill the necessary hole and secure the aerial strand and cable permanently to the pole. After the strand has been placed permanently, the procedure is continued and under good conditions, the strand and cable can be placed at the rate of 135 to 150 feet per minute.

The present invention enables the simultaneous placing of aerial strand and aerial cable in such a manner that the cable is lashed to the strand before the strand and cable is permanently attached to the pole. The entire assembly is mounted on the vehicle body and enables the tensioning of both the strand and the cable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for prelashing and stringing aerial cable on spaced poles comprising a self-propelling vehicle including a truck bed, a cable supply reel mounted on the truck bed, a strand supply reel mounted on the truck bed, a vertically extensible derrick mounted on said truck bed spaced from both the cable supply reel and the strand supply reel, strand tensioning means mounted on the truck bed between the strand supply reel and the derrick, a strand guide pulley secured on the upper end of the derrick, cable reel brake means mounted on the truck bed for controlling movement of the cable, a cable guide pulley secured on the upper end of the derrick adjacent the strand guide pulley, said upper end of the derrick being positionable at an elevation substantially equal to the height at which the aerial cable is to be strung on the spaced poles.

2. The structure as defined in claim 1 wherein said strand tensioning means includes an enlarged cable pulley, a brake drum rigid with the pulley, and brake shoes engageable with the brake drum for retarding rotation of the pulley.

3. The structure as defined in claim 2 wherein a hydraulic compensator is engaged by said strand after it leaves the braking pulley, said compensator including a hydraulic pump connected with the brake shoes for varying the force of contact between the brake shoes and the brake drum in response to variation in tension of the strand thereby maintaining substantially constant tension on the strand.

4. The structure as defined in claim 3 wherein said strand tensioning means includes a plurality of pulleys spaced in longitudinal alignment for receiving the strand horizontally over the top edges of the pulleys, and a plurality of adjustable pulleys engaging the top surface of the strand intermediate the pulleys whereby the strand moves in substantially a serpentine manner between the pulleys thereby tensioning the strand.

5. The structure as defined in claim 4 wherein said truck bed is provided with a guide pulley disposed intermediate the strand reel and the tensioning means for guiding the strand from the reel into the tensioning means.

6. The structure as defined in claim 1 wherein said cable reel brake means includes a brake disk mounted on the cable reel, a movable disk for engagement with the disk rigid with the reel, and means for selectively applying pressure to the movable brake disk thereby retarding movement of the cable reel for maintaining a tension thereon.

7. The structure as defined in claim 6 wherein the rotational axis of said cable reel is parallel with the longitudinal axis of the vehicle platform and the rotational axis of said strand reel being transverse to the longitudinal axis of the vehicle thereby enabling the strand and cable to approach the derrick from perpendicular directions.

8. The structure as defined in claim 1 wherein the strand and the cable are jointly discharged from the upper end of the derrick, and including a cable lashing machine mounted and operable on the strand and cable outward from the upper end of the derrick and between the derrick and a pole on which the lashed cable has been secured.

References Cited by the Examiner

UNITED STATES PATENTS

| 106,134 | 8/70 | Dean | 242—75.2 |
| 1,878,859 | 9/32 | Knobenshue | 254—134.3 |
| 2,213,363 | 9/40 | Creswell. | |
| 2,413,909 | 1/47 | Clement et al. | 254—134.3 |
| 2,703,218 | 3/55 | Haskell et al. | |
| 2,723,806 | 11/55 | Carter | 242—75.4 |

FOREIGN PATENTS 337,892   6/59   Switzerland.

WILLIAM FELDMAN, *Primary Examiner.*